US006856861B2

(12) United States Patent
Dirksing et al.

(10) Patent No.: US 6,856,861 B2
(45) Date of Patent: Feb. 15, 2005

(54) APPARATUS FOR PROVIDING PERSONALIZED COSMETICS

(75) Inventors: Robert S. Dirksing, Cincinnati, OH (US); Srinivas Achanta, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 0 days.

(21) Appl. No.: 10/294,383

(22) Filed: Nov. 14, 2002

(65) Prior Publication Data

US 2003/0069667 A1 Apr. 10, 2003

Related U.S. Application Data

(62) Division of application No. 09/584,567, filed on May 31, 2000.

(51) Int. Cl.[7] .................... G06F 17/00
(52) U.S. Cl. .................... 700/239; 700/233
(58) Field of Search .................... 700/231, 233, 700/234, 239

(56) References Cited

U.S. PATENT DOCUMENTS

| | | | |
|---|---|---|---|
| 3,860,015 | A | 1/1975 | Tarro |
| 4,160,271 | A | 7/1979 | Grayson et al. |
| 4,561,850 | A | 12/1985 | Fabbri et al. |
| 4,681,546 | A | 7/1987 | Hart |
| 4,846,184 | A | 7/1989 | Comment et al. |
| 4,871,262 | A | 10/1989 | Krauss et al. |
| 4,909,632 | A | 3/1990 | McFarlane |
| 5,163,010 | A | 11/1992 | Klein et al. |
| 5,311,293 | A | 5/1994 | MacFarlane et al. |
| 5,313,267 | A | 5/1994 | MacFarlane et al. |
| 5,478,238 | A | 12/1995 | Gourtou et al. |
| 5,495,338 | A | 2/1996 | Gouriou et al. |
| 5,537,211 | A | 7/1996 | Dial |
| 5,562,109 | A | 10/1996 | Tobiason |
| 5,562,643 | A | 10/1996 | Johnson |
| 5,622,692 | A | 4/1997 | Rigg et al. |
| 5,626,155 | A | 5/1997 | Saute |
| 5,636,637 | A | 6/1997 | Guiolet et al. |
| 5,643,341 | A | 7/1997 | Hirsch et al. |
| 5,692,291 | A | 12/1997 | Deevi et al. |
| 5,771,524 | A | 6/1998 | Woods et al. |
| 5,785,960 | A | 7/1998 | Rigg et al. |
| 5,797,750 | A | 8/1998 | Gouriou et al. |
| 5,813,420 | A | 9/1998 | Sussman |
| 5,875,110 | A | 2/1999 | Jacobs |
| 5,903,465 | A | 5/1999 | Brown |
| 5,931,166 | A | 8/1999 | Weber et al. |

(List continued on next page.)

FOREIGN PATENT DOCUMENTS

WO WO 95/05892 3/1995

OTHER PUBLICATIONS

P&G Gives Birth to a Web Baby, Business Week, Sep. 27, 1999, pp. 87–88.

Cosmetics.com, web archive date Jan. 1999, printed Nov. 2002.

www.atomica.com (definitions kiosk and self–service application), 1981–2002, printed Nov. 2002.

*Primary Examiner*—Gene O. Crawford
(74) *Attorney, Agent, or Firm*—Dara K. Kendall; Vlad Vitenberg

(57) ABSTRACT

Methods and apparatus are provided for customizing the cosmetics used by a consumer. A consumer provides selection data and a cosmetic product formula is generated therefrom, base ingredients are then dispensed in accordance with the formula and a customized cosmetic product is delivered onto an intermediate surface for subsequent application. Further, a cartridge providing fluids to a customized cosmetic device is disclosed comprising one or more fluids, the fluids are stored in the cartridge, and one or more openings are provided for dispensing the fluids to a customized cosmetic product.

9 Claims, 7 Drawing Sheets

U.S. PATENT DOCUMENTS

| | | | |
|---|---|---|---|
| 5,945,112 A | | 8/1999 | Flynn et al. |
| 5,971,351 A | | 10/1999 | Swaab |
| 5,972,322 A | | 10/1999 | Rath et al. |
| 5,993,792 A | | 11/1999 | Rath et al. |
| 6,177,093 B1 | | 1/2001 | Lombardi et al. |
| 6,238,116 B1 | * | 5/2001 | Smith et al. ................ 401/122 |
| 6,371,129 B1 | * | 4/2002 | Le Bras-Brown et al. .. 132/218 |
| 6,510,366 B1 | * | 1/2003 | Murray et al. ............. 700/239 |
| 6,516,245 B1 | | 2/2003 | Dirksing et al. |

* cited by examiner

APPARATUS FOR PROVIDING PERSONALIZED COSMETICS

CROSS REFERENCE TO RELATED APPLICATIONS

This is a divisional application of application Ser. No. 09/584,567, filed on May 31, 2000.

FIELD OF THE INVENTION

The present invention relates to a method and apparatus for providing a consumer with personalized beauty care cosmetic products.

BACKGROUND OF THE INVENTION

Cosmetic products such as mascara, facial foundation, lipstick, hair dyes, and the like have long been used by consumers to aesthetically enhance their physical appearance. The selection of an optimal product from a broad range of choices is a dilemma for consumers. Moreover, the consumer cannot make his/her choice in a private and comfortable setting while selecting his/her product in a retail establishment. Further, once the choice is made, the consumer is committed to his/her choice until the product is either consumed or discarded. This commitment does not permit subsequent flexibility in mood, expected social situation, skin condition, and the like. Also, the consumer may be dissatisfied with the impression a product has, either as a result of his/her own perception or as communicated by another. Consequently, most consumers have a vast array of unused products in their homes. These unused products often have expiration dates, which are rarely acknowledged by the consumer and, therefore, create potential health hazards to the consumer.

Past approaches to cosmetic personalization have focused on the point of sale occurring in the retail establishment. For example, methods permit a salesperson to manually adjust the formulation of facial foundations so as to match the consumer's skin color. More recent approaches have advanced this idea by providing automatic cosmetic dispensing devices at a retail establishment. These more recent devices are operated by retail store personnel to produce a product which is packaged in a container and provided to the consumer.

Although the abovementioned approaches partially address a consumer's need for personalization, there are several significant disadvantages. For example, these approaches assume that a consumer will not change his/her mind, regarding the purchased product, on a frequent basis after using the product. Under either approach listed above, a change of mind on the consumer's part requires him/her to repurchase another entire container of cosmetic product. Further, the consumer must physically visit the retail establishment and again make selections in a public setting. These approaches are inconvenient, expensive and still result in significant cosmetic inventory at the consumer's home. Moreover, the expiration dates associated with the consumer's cosmetic inventory will often expire before the consumer ever finishes the product.

Furthermore, existing point of sale cosmetic dispensing devices fill a container with a cosmetic product, requiring the product to be transferred onto an applicator prior to use by the consumer. For example, point of sale customized facial cream is typically provided in a bottle at the retail establishment. Prior to the consumer using the customized facial cream, the cream must be transferred to the consumer's hand or onto a pad where it is subsequently applied by the consumer. If the consumer is unhappy with the customized facial cream, the entire bottle of cream remains unused because, existing devices do not permit dispensing a single application quantity of the facial cream onto an intermediate surface for a single application by the consumer.

SUMMARY OF THE INVENTION

Accordingly, an object of the invention is to provide consumers with a method and apparatus for receiving customized cosmetic products.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and an apparatus are provided for providing customized cosmetic products to a consumer.

A method of providing customized cosmetics to a consumer is provided, comprising providing ingredients for producing cosmetic products and receiving selection data from a consumer. Further, a cosmetic product formula is generated using the ingredients and the selection data, and the customized cosmetic product is dispensed for subsequent application.

Further, an apparatus for producing a customized cosmetic product is provided, comprising a selection device for providing selection data, reservoirs for storing fluids, and a fluid metering device for producing a cosmetic product matching the selection data using the selection data and the fluids. Moreover, a dispenser is provided for depositing the cosmetic product onto an intermediate surface for subsequent application.

Also, a cartridge for use with a cosmetic device to supply the device with ingredients is provided, comprising one or more fluids each fluid having a color, a composition and, the cartridge having an encasing shell housing the fluids. Further, the cartridge has openings for dispensing the fluids to produce a customized cosmetic product on an intermediate surface for subsequent application.

Finally, an applicator used to collect a customized cosmetic product from a cosmetic device is provided, comprising a surface capable of accumulating a cosmetic product produced from a cosmetic device and used by a consumer to apply the cosmetic to the consumer's body.

Still other aspects of the present invention will become apparent to those skilled in the art from the following description of an exemplary embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present embodiment of the invention, an example of which is illustrated in the accompanying drawings, wherein like numerals indicate the same element throughout the views.

DETAILED DESCRIPTION

An exemplary embodiment of the present invention is implemented using standard mechanical pumps, mixing devices, heaters, dispensers, microprocessors, and cosmetic ingredients well known in the art and readily combinable in accordance with the present invention.

Figure 1:
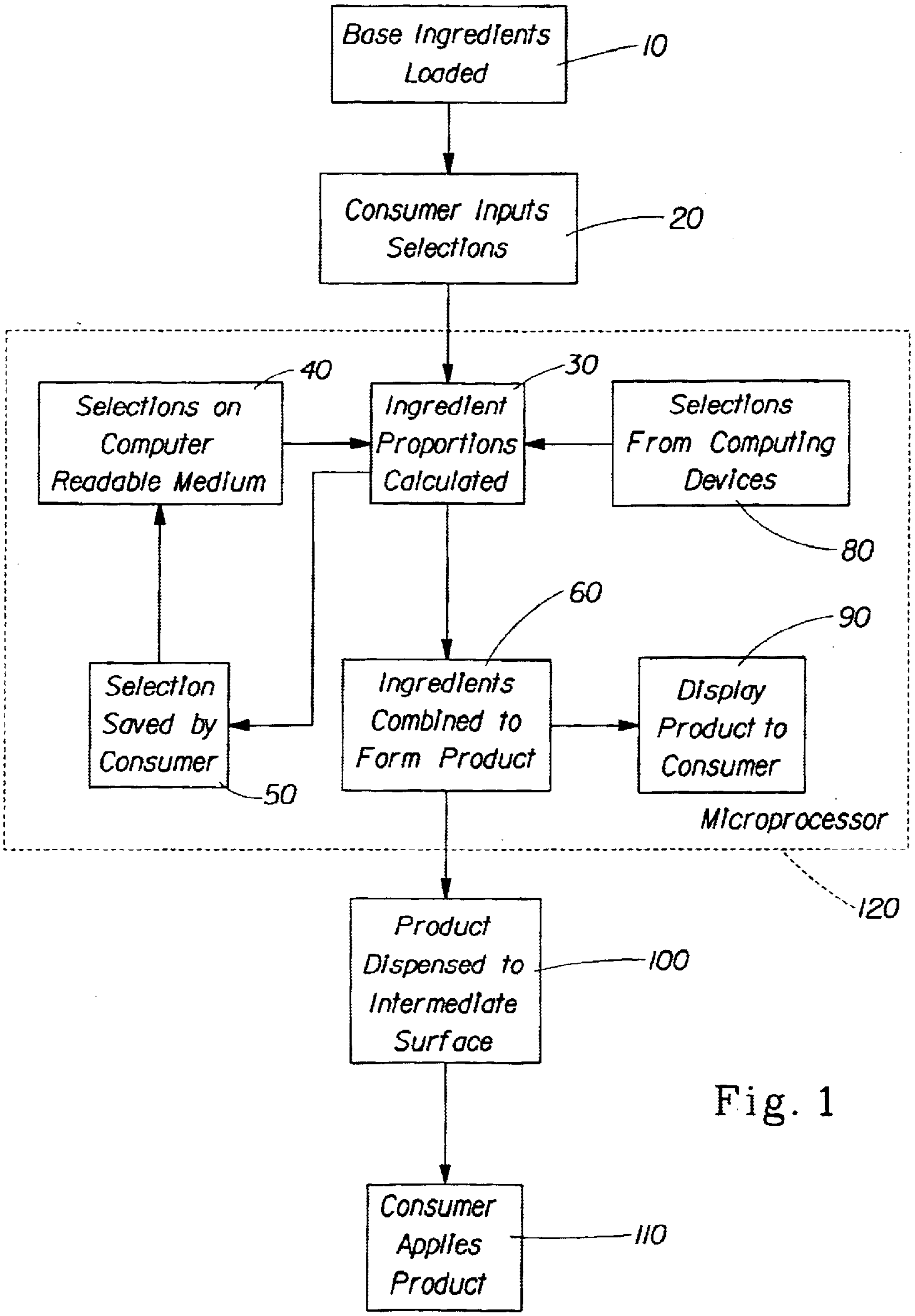
FIG. 1 depicts a flow diagram of a method of providing customized cosmetic products.

FIG. 1 depicts a flow diagram of a method for providing customized cosmetic products. Initially, base ingredients are loaded or provided in step 10. The base ingredients are preferably fluids such as waxes, powders, liquids, and the like. Preferably, at least two base fluids are provided with each fluid having a consistency and a color.

Next, a consumer inputs desired color and product selections in step 20. Preferably, the product selection will dictate the consistency of the desired customized cosmetic product. For example, a product selection of a lipstick would require a thicker consistency than that of a product selection for a body lotion. A consumer inputs these selection data in a variety of ways such as with a color slide selector, keyboard, mouse, computing device (step 80), digital phone, digital camera, digital video recorder, and the like. These selections made by the consumer may be retrieved from a computer readable medium as in step 40, or these selections may be saved from previously made selections and stored to a computer readable medium as in step 50.

Once the consumer has determined the selections for his/her customized cosmetic product, the proportions of the base ingredients will be known. Calculating the proportions of known base ingredients necessary to create a specific type (product selection) of cosmetic product is well known and readily ascertainable to those skilled in the art. Moreover, creating the appropriate color shading of the cosmetic product is trivial, once the consumer has made his/her color selections. The appropriate ingredient proportions are calculated in step 30. The ingredients are then combined to form the desired cosmetic product in step 60. Prior to generating the cosmetic product for the consumer, the color selections may be displayed to the consumer in step 90. Displaying the color shading is preferably achieved with a color selector, such as a touch membrane, this reduces the expense associated with developing a cosmetic device of the present invention. Although as one skilled in the art will appreciate, displaying color selections may occur through a variety of devices such as a monitor, a television, a digital camera, a digital video recorder, a computing device, and the like.

Preferably, steps 30 through 90 occur in a microprocessor environment 120 wherein interfacing with the consumer and performing the ingredient calculations are simple tasks. The microprocessor environment 120 makes software and hardware readily available and easily ascertainable to those skilled in the art to perform steps 30 through 90.

In step 100, a customized cosmetic product is dispensed to an intermediate surface. An intermediate surface includes a surface wherein the customized cosmetic product resides just prior to application on the consumer's desired body location. An intermediate surface includes a swab, a tissue, a sponge, a brush, a finger, an applicator, a comb, a plate, and the like. For example, a customized cosmetic product, such as facial cream, may be dispensed in step 100 to a consumer's finger (intermediate surface). The cream is then applied to the consumer's face (desired body location). However, when an intermediate surface is a plate a subsequent intermediate surface may be necessary before applying the product. For example, customized cosmetic product dispensed to a plate (intermediate surface) may be collected with a finger (intermediate surface) and then applied to the consumer's desired body location.

Finally, in step 110 the consumer applies the dispensed customized cosmetic product. If the consumer later decides that the product's color selection was not acceptable to him/her, new selection data may be provided to produce a new customized cosmetic product. In this way, the consumer can tailor and efficiently use a variety of customized cosmetic products. Moreover, these selections are made in a private setting providing the consumer with more privacy and comfort during the overall process.

Figure 2A:
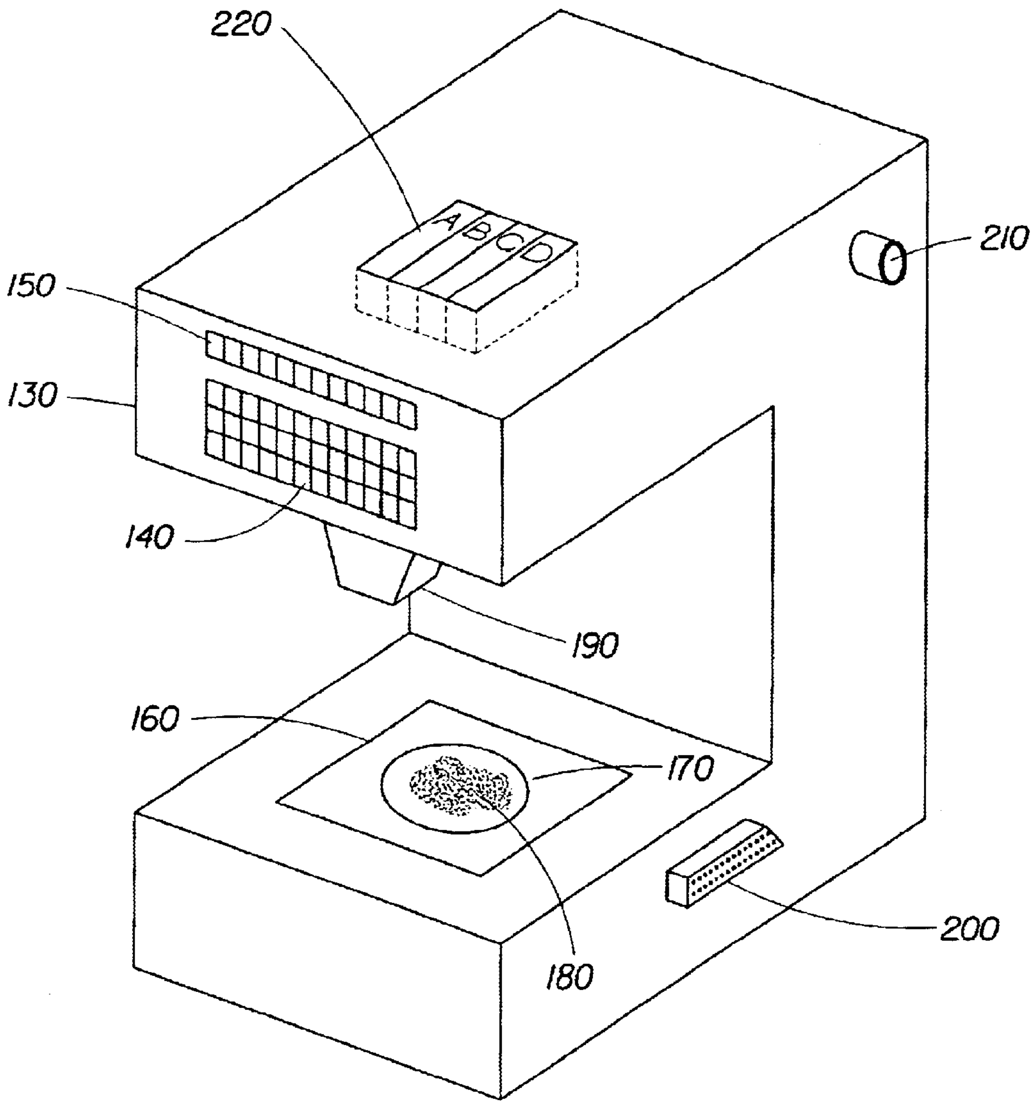
FIG. 2A depicts a schematic of an apparatus of the present invention.

FIG. 2A depicts a schematic of an apparatus of the present invention. The apparatus of FIG. 2A is one exemplary embodiment of the present invention depicting a customized cosmetic dispensing device 130. The device 130 includes cartridges 220, a video port 210, a communications port 200, a slide selector 150, a palette of colors 140, a dispenser 190, and a surface 160.

The device 130 preferably houses one or more cartridges 220 wherein the fluids (ingredients) reside, which when combined in consumer driven quantities produce a customized cosmetic product 180 on a surface 160 of the device 130 or on an intermediate surface 170. Each cartridge 220 may house one or more fluids. However, as will be appreciated, the cartridges 220 housing the fluids need not be required at all, since the fluids could easily be added to reservoirs included in the device 130 (not shown in FIG. 2A).

As previously discussed with FIG. 1 above, the ingredients are preferably waxes comprising various colors and consistencies necessary to produce a variety of cosmetic products, such as lipstick, eye liner, lotion, powder, mascara, and the like. The consumer provides selection data which will drive the required fluid quantities necessary to produce the customized cosmetic product 180. These selection data include color and product selection such as lipstick, eyeliner, lotion, powder, mascara, and the like.

The consumer provides these selection data via one or more input selection means attached or interfaced to the device 130, such as a palette of colors 140, a slide selector 150, a video port 210, and a communications port 200. The video port 210 permits the device 130 to receive consumer selection data from devices such as a video, a digital camera, a television, and the like. The communications port 200 permits the device 130 to receive consumer selection data from devices such as digital phones, computers, hand-held computing devices, wireless communication devices, and the like. Further, the communications port 200 need not be a physical connection to the device 130, rather, this port may be a wireless or infrared port. Also, the communications port 200 could be connected to a sensor, which measures color, moisture, oiliness, texture, skin sensitivity, and the like. These measurements may permit preselected algorithms to determine optimal selection data for a consumer.

Additionally, a single line LCD (not shown) may permit a consumer to enter selection data as a numeric value which represents product and color choices. Moreover, the communications port 200 and the video port 210 may be used by the device 130 to display to the consumer the color selections provided by the consumer. These selections are also available to the consumer via the palette of colors.

As described above, consumers may provide selection data in a variety of ways to the device 130. In fact, prepackaged selection data may be made available to a consumer via automated phone system or an internet web site where the consumer may retrieve numeric codes representing selection data necessary to generate existing market products. In this way, the consumer may produce on an as needed basis cosmetic product representing name-brand products. Further, these prepackaged selections may be provided in advertising material for the name-brand products.

Once the consumer has selected his/her color and product, the device 130 will calculate the appropriate fluid quantities needed to produce the customized cosmetic product 180. The fluids are then appropriately dispensed from the cartridges 220, mixed or heated as needed to permit discharge from the device 130, and deposited through a dispenser 190 onto an intermediate surface 170 or a surface 160 attached to the device 130. The dispenser 190 preferably uses a controlled dispensing technology such as pressure spraying, twin-fluid spraying, electrostatic spraying, mechanical screw extrusion, piezo electric spraying, sputtering technology, and the like. The deposited customized cosmetic product 180 may exit the device 130 in a number of forms such as a spray, a dollop, or a coating.

Figure 2B:
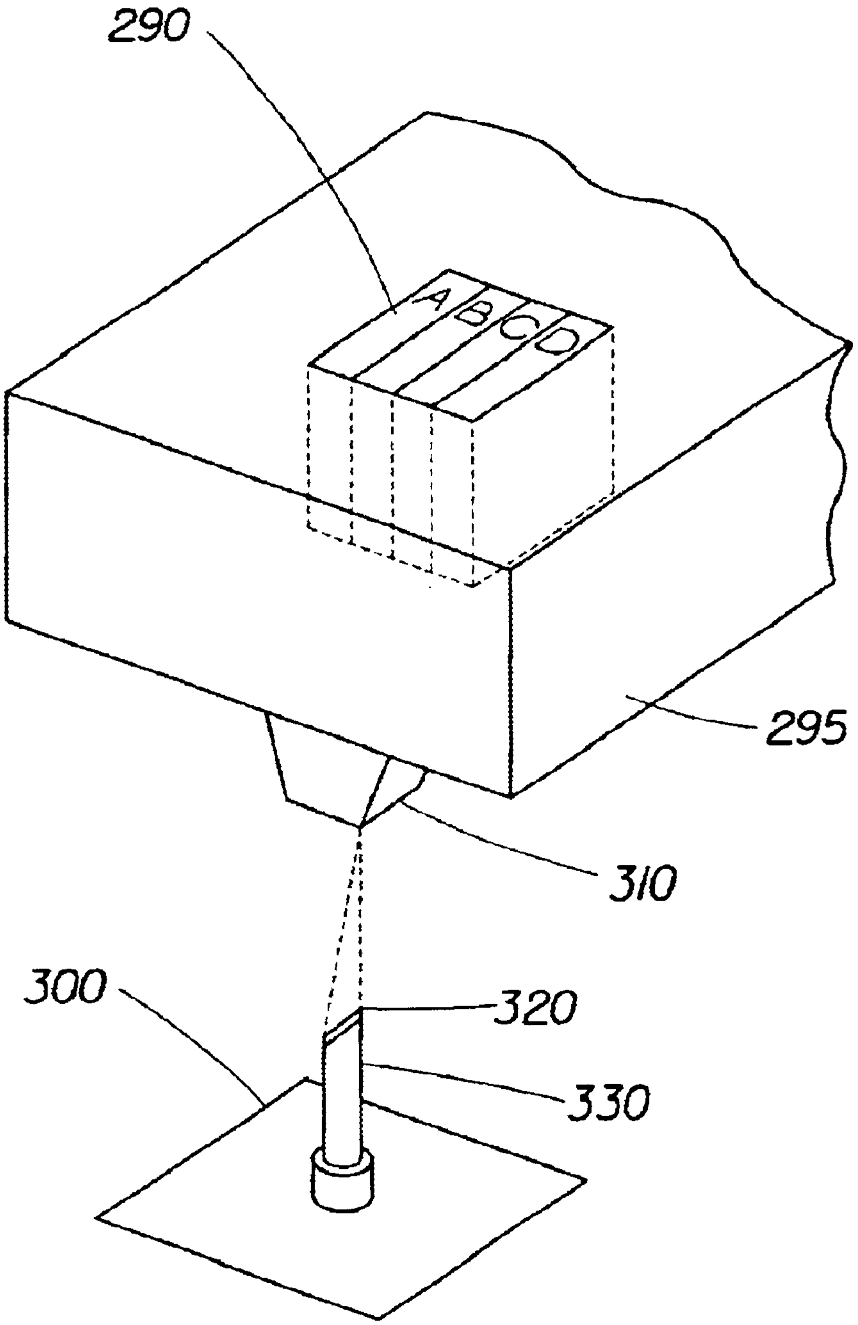
FIG. 2B depicts a schematic of an alternative apparatus of the present invention.

FIG. 2B depicts a schematic of an alternative apparatus of the present invention. In FIG. 2B, a cosmetic device 295 is depicted wherein the device 295 is horizontal and detached from a surface 300. Such a device 295 would permit easy attachment to a wall in a consumer's home and make more efficient use of available counter space in a consumer's home.

Similar to the device of FIG. 2A, cartridges 290 housing the fluids are provided and, the customized cosmetic product 320 is discharged from the device 295 through a dispenser 310. Moreover, the customized cosmetic product 320 is capable of being directly discharged onto an intermediate surface 330, such as a lipstick applicator. Although not shown in FIG. 2B, a consumer input selection means may be provided in a variety of ways as discussed with FIG. 2A. Further, consumer selection data may be displayed to the consumer prior to discharging the customized cosmetic product 320.

Figure 2C:
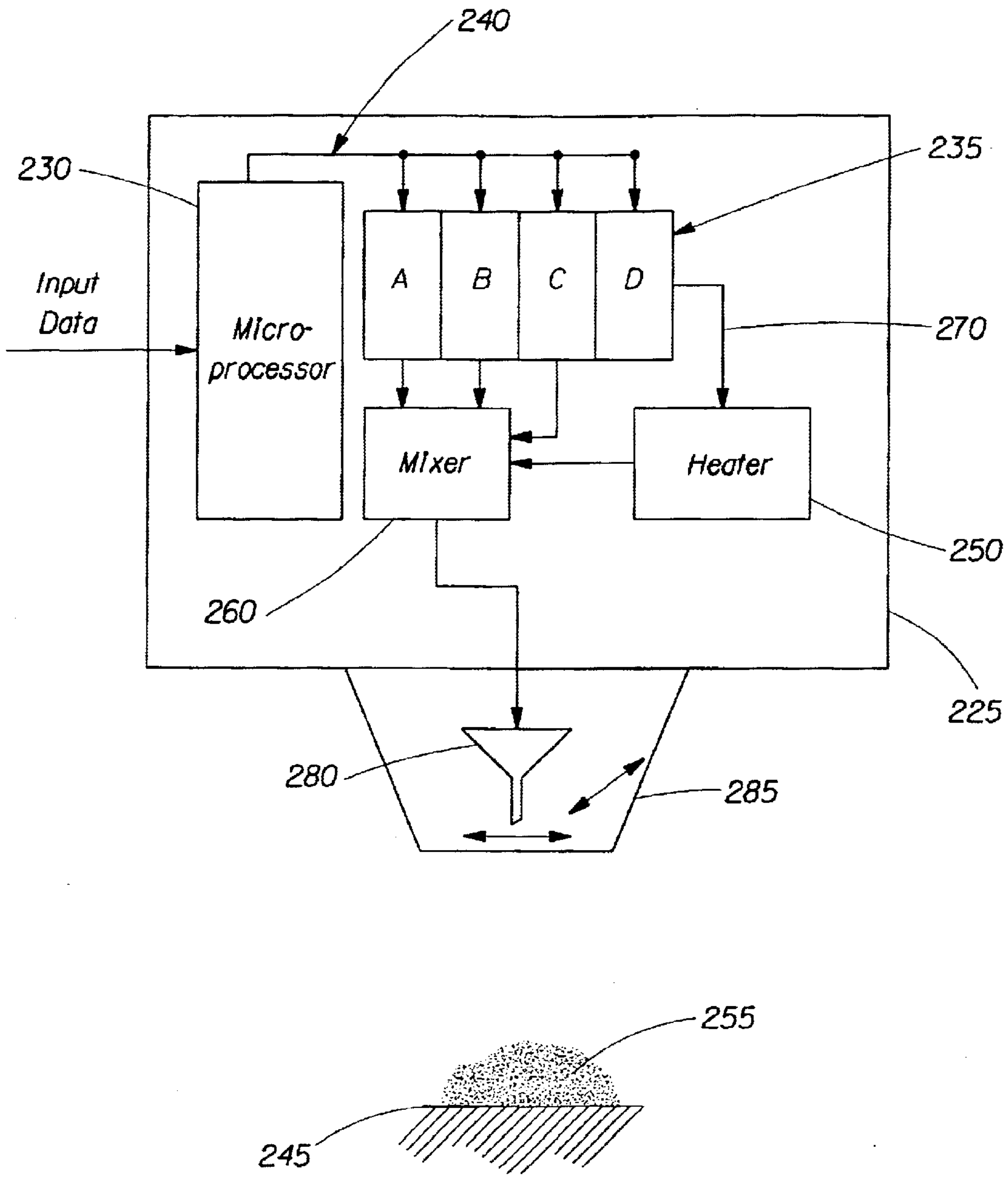
FIG. 2C depicts an internal schematic view of an apparatus of the present invention.

FIG. 2C depicts an internal schematic view of an apparatus of the present invention. The internal schematic view more particularly depicts a metering device of a customized cosmetic product device 225 and the dispenser 285. The metering device illustrates how the fluids are combined in varying quantities to produce a customized cosmetic product 255 on a surface 245. FIG. 2C also illustrates how the fluids are discharged from the device 225 through a dispenser 285. The cosmetic device 225 includes a microprocessor 230, a data bus 240, cartridges 235, a piping system 270, a mixer 260, a heater 250, an ejector 280, and a dispenser 285.

After selection data is received by the microprocessor 230 in device 225, signals are sent to the cartridges 235 via a data bus 240. The signals drive the cartridges 235 to release the fluids in the appropriate quantities which are dictated by the selection data input to the microprocessor 230. The microprocessor 230 uses calculations, which are well known to one skilled in the art, for producing a formula which selects the appropriate quantities of the fluids contained in the cartridges 235. The fluids include dyes such as Cyan, Magenta, Yellow, and the like, permitting color customization. Further, the fluids also include waxes, sunscreens, moisturizers, perfumes, wrinkling and anti-aging inhibitors, and the like.

Once the appropriate quantities of the fluids are released from the cartridges 235, they are pushed through a piping system 270 which allows movement of the fluids from the cartridges 235 to the dispenser 285. Preferably, fluid movement is achieved by using gravity but, movement may be accomplished through any mechanical means, such as a screw extruder, and the like.

Upon exiting the cartridges 235, the fluids may be mixed using a mixer 260 or heated using a heater 250. Preferably, mixing occurs by using a static micromixer which is available from the Institute of Microtechnik (Maniz, Germany). The heater 250 enhances the fluidity of the fluid when the fluid includes wax-like ingredients. Moreover, the mixer 260 releases the mixed fluids into an ejector 280. The ejector 280 is mobile, which permits uniform dispensing of the customized cosmetic product 255 onto a surface 245 through the dispenser 285. As previously discussed, the dispenser 285 may be implemented using any one or combinations of controlled dispensing technologies such as pressure spraying, twin-fluid spraying, electrostatic spraying, mechanical screw extrusion, piezo electric spraying, sputtering technology, and the like.

Figure 2D:
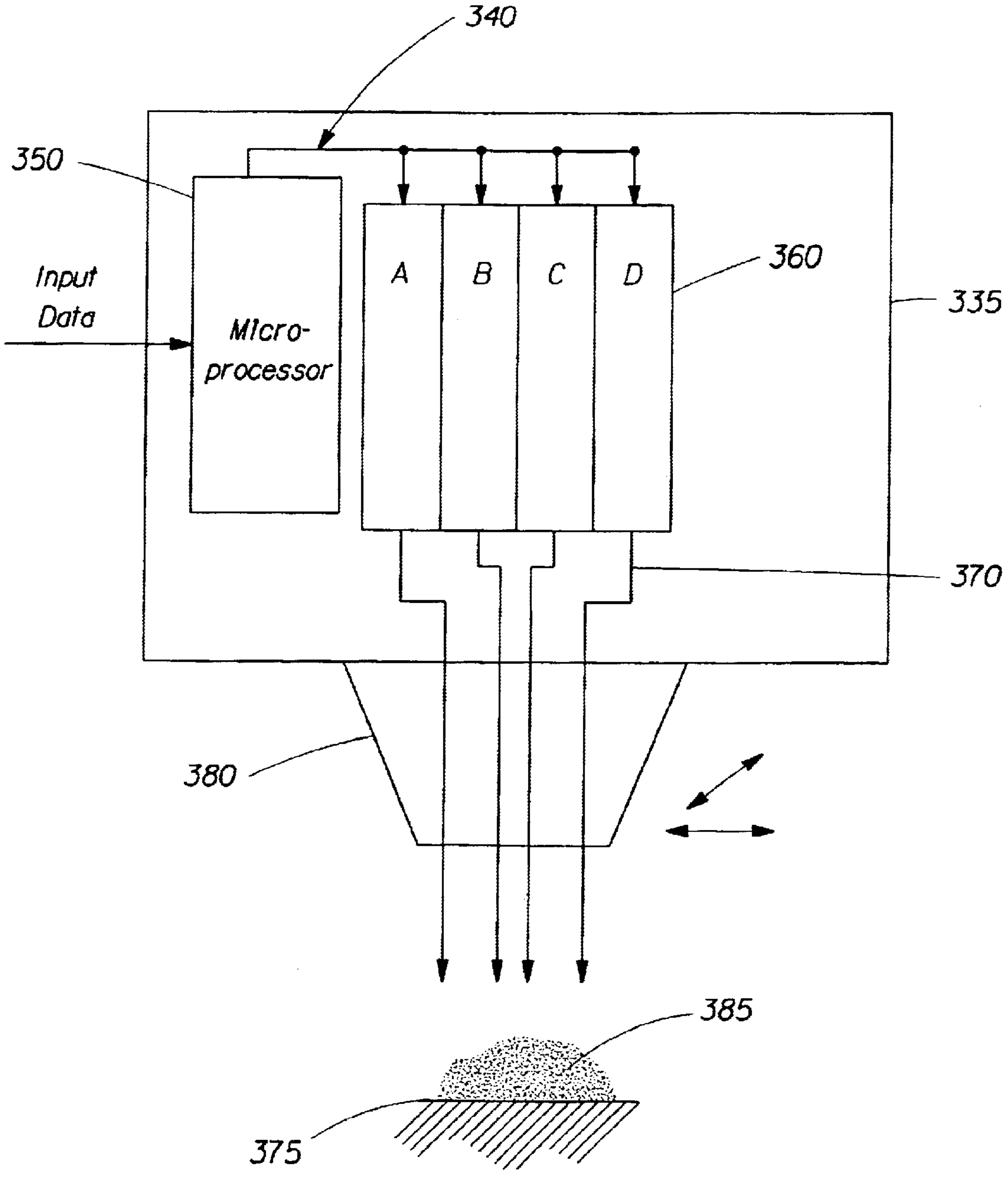
FIG. 2D depicts an internal schematic view of an alternative apparatus of the present invention.

FIG. 2D depicts an internal schematic view of an alternative apparatus of the present invention. The cosmetic device 335 includes a microprocessor 350, a data bus 340, cartridges 360, a piping system 370 for moving the fluid from the cartridges, and a dispenser 380.

Again in FIG. 2D, the microprocessor 350 receives selection data which is used to drive the microprocessor to issue commands through a data bus 340, causing specific quantities of the fluids contained in the cartridges 360 to be released into the piping system 370. However, in FIG. 2D the fluids of device 335 are not combined to form a customized cosmetic product 385 on a surface 375, until the fluids are accumulated on the surface 375 and have exited the device 335 through a dispenser 380. Moreover, the device 335 includes a dispenser 380, which travels back and forth by the action of a step motor (not shown) in response to commands issued from the microprocessor 350. This motion of the dispenser 380 allows control of the placement of the fluids on the surface 375 and creates color perceptions similar to those obtained, by way of example, from ink-jet printing dyes on a paper medium.

Furthermore, as will be appreciated by one skilled in the art the devices of FIGS. 2A, 2B, 2C, and 2D need not have cartridges housing the fluid ingredients, as fluid reservoirs may be built directly into these devices obviating the need for any cartridges.

Figure 3:
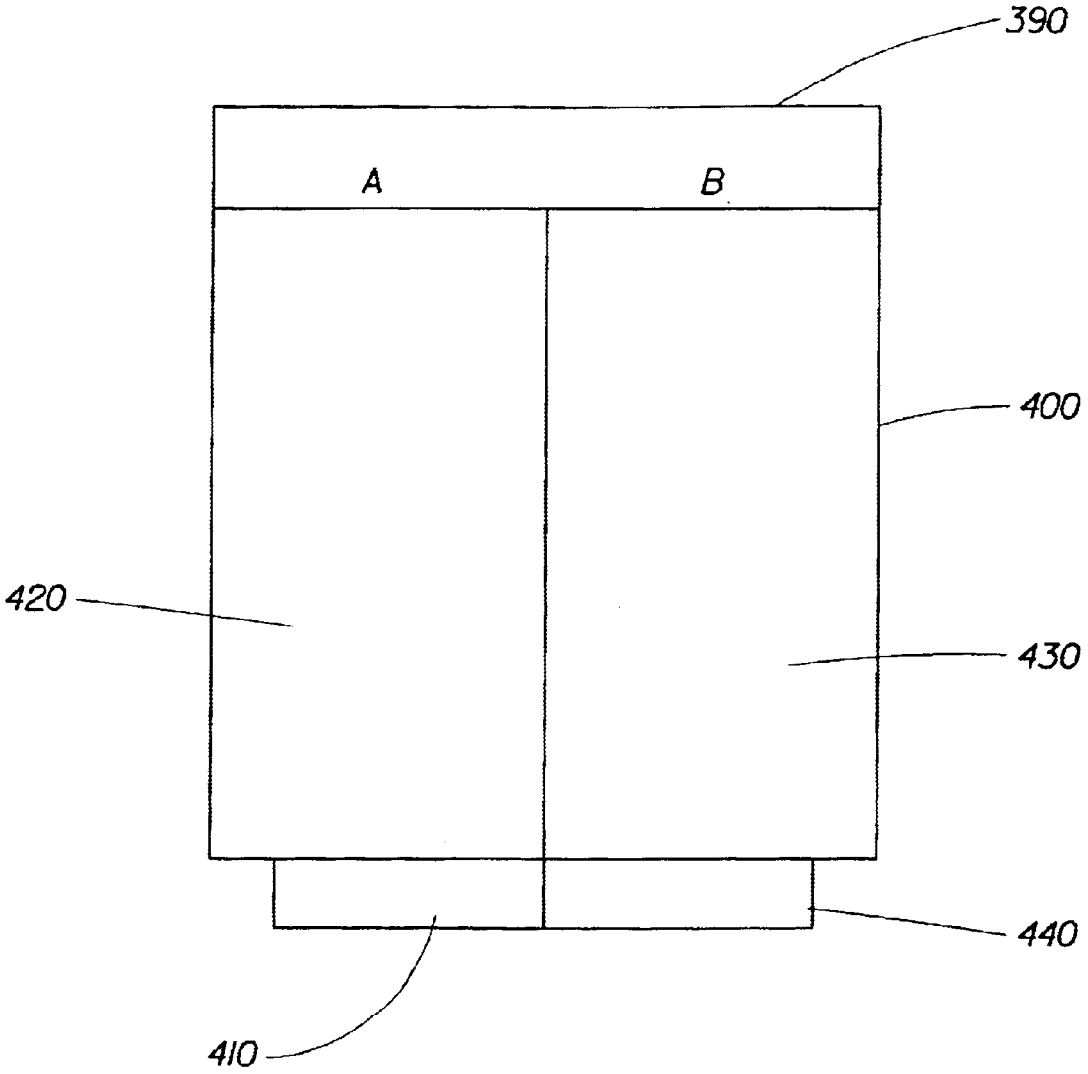
FIG. 3 depicts a cartridge of the present invention.
Figure 4A:
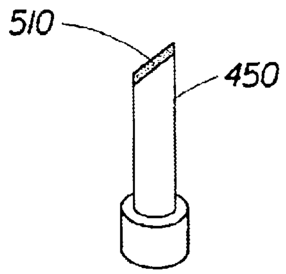
FIG. 4 depicts applicators of the present invention.
Figure 4B:
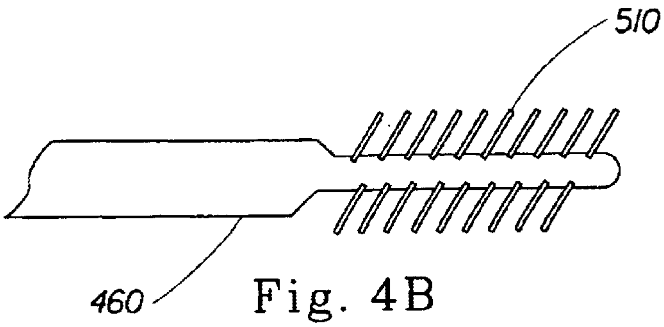
Figure 4C:
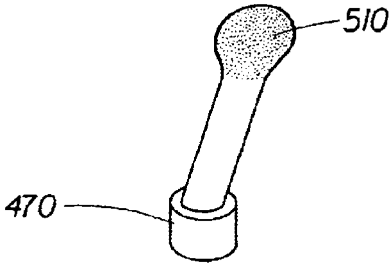
Figure 4D:
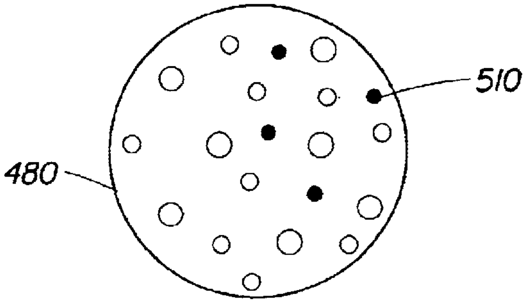
Figure 4E:
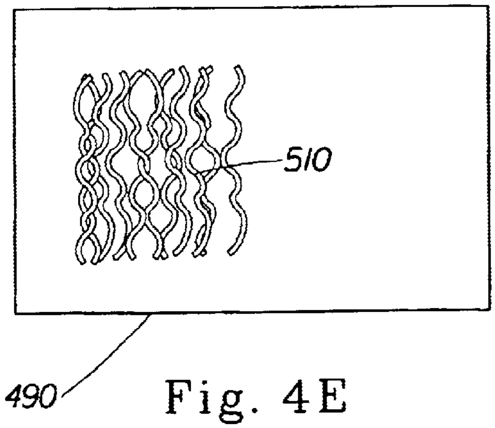
Figure 4F:
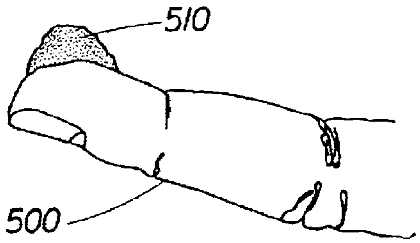
Figure 4G:
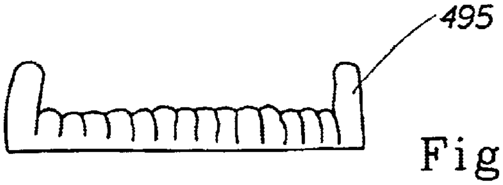

FIG. 3 depicts a cartridge of the present invention. A cartridge 390 is provided including a outer encasing shell 400, divided fluid receptacles 420 and 430, and openings 410 and 440. Cartridge 390 is shown with fluid receptacles for two fluids, fluid A and fluid B. Fluid A resides in receptacle 420 while fluid B resides in receptacle 430. Further, fluid A is released from cartridge 390 through opening 410 and fluid B released through opening 440. Fluids A and B, are preferably wax-like substances containing a variety of dyes, sunscreens, moisturizers, perfumes, wrinkling and anti-aging inhibitors, and the like. These fluids are used in a cosmetic device to be combined in quantities dictated by a consumer to produced a customized cosmetic product for the consumer.

Although, FIG. 3 depicts a cartridge 390 of the present invention with two fluid receptacles, it would be readily apparent to those skilled in the art that a single fluid may be provided. In this way, multiple cartridges could be used with a cosmetic device, each single cartridge including a single fluid. The customized cosmetic product is then produced by the cosmetic device releasing specific quantities of fluids from each of the multiple cartridges. Conversely, a single cartridge may contain more than two fluid receptacles if greater product variety is desired. Moreover, the cartridges of the present invention may be disposable or reusable. Reusability, could be achieved by refilling fluids into the fluid receptacles when they are depleted.

FIG. 4 depicts applicators of the present invention. These applicators are capable of accumulating customized cosmetic product 510 dispensed from a cosmetic device. Moreover, the customized cosmetic product 510 may be directly accumulated on the applicators of FIG. 4 from a cosmetic device in a variety of forms such as a spray, a dollop, a coating, and the like. The customized cosmetic product 510 may alternatively be accumulated on the applicators of FIG. 4 by wiping the applicators against a surface of the cosmetic device where the customized cosmetic product 510 has been accumulated.

By way of example, a lipstick applicator 450, a brush applicator 460, a swab applicator 470, a sponge applicator 480, a tissue applicator 490, a comb applicator 495, and a human finger applicator 500 are depicted in FIG. 4. Further, these applicators are capable of being disposable or reusable.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For example, this invention can be embodied as a device for customizing foundation and other cosmetic masking products, nail polish, lipstick, mascara, eye shadow, eye liner, and the like. Further, this invention can be used to mix chemistries at the point of use to produce novel beneficial chemicals. Moreover, the apparatus may be used as a sampler or an informational tool for personalized marketing purposes. Accordingly, this invention is intended to embrace all alternatives, modifications, and variations that fall within the spirit and broad scope of the attached claims.

What is claimed is:

1. An apparatus for producing a customized cosmetic product comprising:

a section device for providing selection data;

one or more reservoirs for storing a plurality of fluids;

fluid metering device for producing a cosmetic product matching the selection data using the selection data and the fluids; and a dispenser for depositing the cosmetic product on an intermediate surface for subsequent application, with the proviso that the intermediate surface does not comprise a container.

2. The apparatus of claim 1, further comprising:

a display device for confirming the cosmetic product prior to dispensing.

3. The apparatus of claim 1, wherein the intermediate surface is at least one of:

a swab;

a finger;

a tissue;

a sponge;

a comb;

a brush; and a plate.

4. The apparatus of claim 1, wherein the intermediate surface is part of the dispensing device and the cosmetic product is transferrable from the intermediate surface to an applicator.

5. The apparatus of claim 1, wherein the dispensing device dispenses the cosmetic product in at least one of the forms of:

a spray;

a dollop; and a coating.

6. The apparatus of claim 1, further comprising:

a communications port capable of receiving standard selection data for use by the fluid metering device in producing the cosmetic product.

7. A cartridge for use with a cosmetic device to supply the device with ingredients comprising:

one or more fluids, each fluid having a color and a composition;

a housing for storing the fluids; and one or more openings for dispensing the fluids to produce a customized cosmetic product on an intermediate surface for subsequent application, with the proviso that the intermediate surface does not comprise a container.

8. The cartridge of claim 7, wherein the cartridge is disposable.

9. The cartridge of claim 7, wherein the cartridge is reusable by refilling the cartridge with one or more of the fluids.

* * * * *